US009146937B2

(12) United States Patent
Benjamin et al.

(10) Patent No.: US 9,146,937 B2
(45) Date of Patent: Sep. 29, 2015

(54) CLIENT-BASED DATA REPLICATION

(75) Inventors: Matthew W. Benjamin, Ann Arbor, MI (US); Adam C. Emerson, Ann Arbor, MI (US); Peter Honeyman, Ann Arbor, MI (US)

(73) Assignee: Cohort FS, LLC, Ann Arbor, MI (US)

( * ) Notice: Subject to any disclaimer, the term of this patent is extended or adjusted under 35 U.S.C. 154(b) by 521 days.

(21) Appl. No.: 13/530,718

(22) Filed: Jun. 22, 2012

(65) Prior Publication Data
US 2012/0330892 A1    Dec. 27, 2012

Related U.S. Application Data

(60) Provisional application No. 61/571,230, filed on Jun. 23, 2011.

(51) Int. Cl.
G06F 17/30          (2006.01)
(52) U.S. Cl.
CPC ................................. G06F 17/30212 (2013.01)
(58) Field of Classification Search
CPC .................................................. G06F 17/30212
USPC .................................................. 707/610, 687
See application file for complete search history.

(56) References Cited

U.S. PATENT DOCUMENTS

| | | | |
|---|---|---|---|
| 5,588,147 A | | 12/1996 | Neeman et al. |
| 5,819,020 A * | | 10/1998 | Beeler, Jr. .................... 714/5.11 |
| 7,363,431 B1 * | | 4/2008 | Niver et al. .................... 711/141 |
| 7,743,023 B2 | | 6/2010 | Teodosiu et al. |
| 7,882,064 B2 | | 2/2011 | Lee et al. |
| 7,979,652 B1 * | | 7/2011 | Sivasubramanian .......... 711/162 |
| 2003/0023618 A1 | | 1/2003 | Orbits et al. |
| 2005/0195735 A1 | | 9/2005 | Brady et al. |
| 2009/0327361 A1 * | | 12/2009 | Mills et al. ..................... 707/204 |
| 2010/0153415 A1 * | | 6/2010 | Muntz ............................ 707/758 |
| 2011/0078467 A1 * | | 3/2011 | Hildebrand .................... 713/310 |
| 2011/0137916 A1 | | 6/2011 | Deen et al. |
| 2011/0145324 A1 * | | 6/2011 | Reinart et al. ................ 709/203 |
| 2011/0282834 A1 * | | 11/2011 | Desai et al. ................... 707/611 |
| 2012/0303576 A1 * | | 11/2012 | Calder et al. .................. 707/611 |
| 2013/0006928 A1 * | | 1/2013 | Holden et al. ................ 707/622 |

OTHER PUBLICATIONS

Article entitled "Metadata Striping in pNFS", by Eisler, dated Nov. 21, 2008.*
ZFS End-to-End Data Integrity, Jeff Bonwick's Blog, Dec. 8, 2005 at<Http://blogs.oracle.com/bonwick/entry/zfs_end_to_end_data> (8 pages).
zfs-discuss, [cryptography] rolling hashes, EDC/ECC vs MAC/MIC, etc., May 22, 2011 at <http://www.mail-archive.com/zfs-discuss@opensolaris.org/msg45791.html> (3 pages).
Small Business Innovation Research, SBIR Phase I: pNFS in the Cloud (pITC): A Replicated, Parallel File System for Cloud Computing, Jul. 7, 2014, https://www.sbir.gov/sbirsearch/detail/15915 (2 pages).
International Search Report, PCT/US2012/043790.

* cited by examiner

*Primary Examiner* — Mahesh Dwivedi
(74) *Attorney, Agent, or Firm* — Bejin Bieneman PLC

(57) ABSTRACT

A client computing device having a processor and a memory receives, in response to a request, a replication layout from a replication controller. The client device initiates a data replication request at each of a plurality of data servers according to the replication layout. The client device receives, from each of the data servers, integrity information representing a state of a replication dataset at each of the servers. The client device transmits the integrity information to the replication controller.

15 Claims, 4 Drawing Sheets

US 9,146,937 B2

CLIENT-BASED DATA REPLICATION

This application claims the benefit of U.S. Provisional Application Ser. No. 61/571,230 filed Jun. 23, 2011, entitled "REPLICATION LAYOUTS: MUTABLE, CONSISTENT, CLIENT-BASED FILE-SYSTEM REPLICATION," which is hereby incorporated by reference in its entirety.

This invention was made with Government support under NSF SBIR Phase I Award ID 1014137, awarded by the National Science Foundation. The Government has certain rights in this invention.

BACKGROUND INFORMATION

File replication is widely employed in data storage, e.g., data distribution and file sharing systems. Examples of distributed file system protocols and/or services include the Andrews File System (AFS), Distributed Computing Environment (DCE), Distributed File System (DFS), Lustre, the General Parallel File System (GPFS), Coda, etc. Examples of network file systems and protocols include Network File System (NFS), Common Internet File System (CIFS), Network for Protocol (NCP). Distributed file systems and network file systems generally include intrinsic organizing structures such as hierarchical namespace control (e.g., nested files and directories, junctions, etc.). These kinds of file systems also include well-defined file access and concurrent sharing semantics, as well as consistency guarantees that are generally difficult to implement in combination with replication.

In distributed file system protocols, support for replication is typically implemented transparently between data servers or storage systems, with limited involvement by clients. However, infrastructure and architectural limitations of distributed file systems limit replication capabilities. For example, in file systems employing server-to-server replication, replication performance is strongly limited by bandwidth between cooperating data servers.

DETAILED DESCRIPTION OF PREFERRED EMBODIMENTS

Abbreviations used in this disclosure include the following:
IA: integrity assertion;
RCL: replication client;
RCR: replication controller;
RDS: replication data server;
UC: underlying configuration of a data storage system.

Further, a "replication layout," or, simply, a "layout" refers to a pattern of computation introduced in NFS version 4.1 ("NFSv4.1"), where a layout is used to define, for a specific client and a specific coordinating server (the meta-data server, or MDS, in NFSv4.1 terminology), an association between a specific file or data object, or contiguous logical byte range of the data object, which potentially exists on multiple data servers, and a specific set of data servers, for a finite period of time. A layout is referred to as a "pattern of computation" because a layout is expressed as a sequence of messages establishing and controlling the state of the file or data object, and as extensible because the layout mechanism permits definition of new layout types with layout-type-specific message data. In NFSv4.1, layouts are used solely to coordinate parallel access to file (i.e., block or object) data resident on distinct, but coordinating, data servers.

A client-based replication system and client replication control protocol, as disclosed herein, includes a replication layout mechanism that achieves strongly consistent replication of file system objects across geographically dispersed storage servers, while delegating responsibility for input/output operations to clients, under centralized control of a replication controller. The mechanism may be used in the context of NFSv4.1, parallel NFS ("pNFS"), or any distributed data sharing mechanism which provides a state-management protocol abstraction such as may be provided, for example, by pNFS layouts. Further, the replication layout mechanism can be employed whenever a set of replication servers exists for a specific data set, the data distributed on a subset of the replication servers is consistent, and a replication controller can be established for the dataset. The underlying configuration of replication servers and datasets can vary between instances of the mechanism, or in the same instance at different times. For example, the replication servers may be operating under a server-to-server replication control protocol such as hierarchical replication control. A fixed configuration of replication servers, i.e., where there is a single fixed dataset on all replication servers, and where there is a nominated, fixed replication controller authoritative for the dataset at all servers, may also be compatible with the replication layout mechanism.

A first formal control mechanism may coordinate replication operations at multiple clients, and second mechanisms may provide a reliable (unimpeachable) assertion of correct final replication state to a coordinating replication server, relying solely on the clients for data communication.

Figure 1:
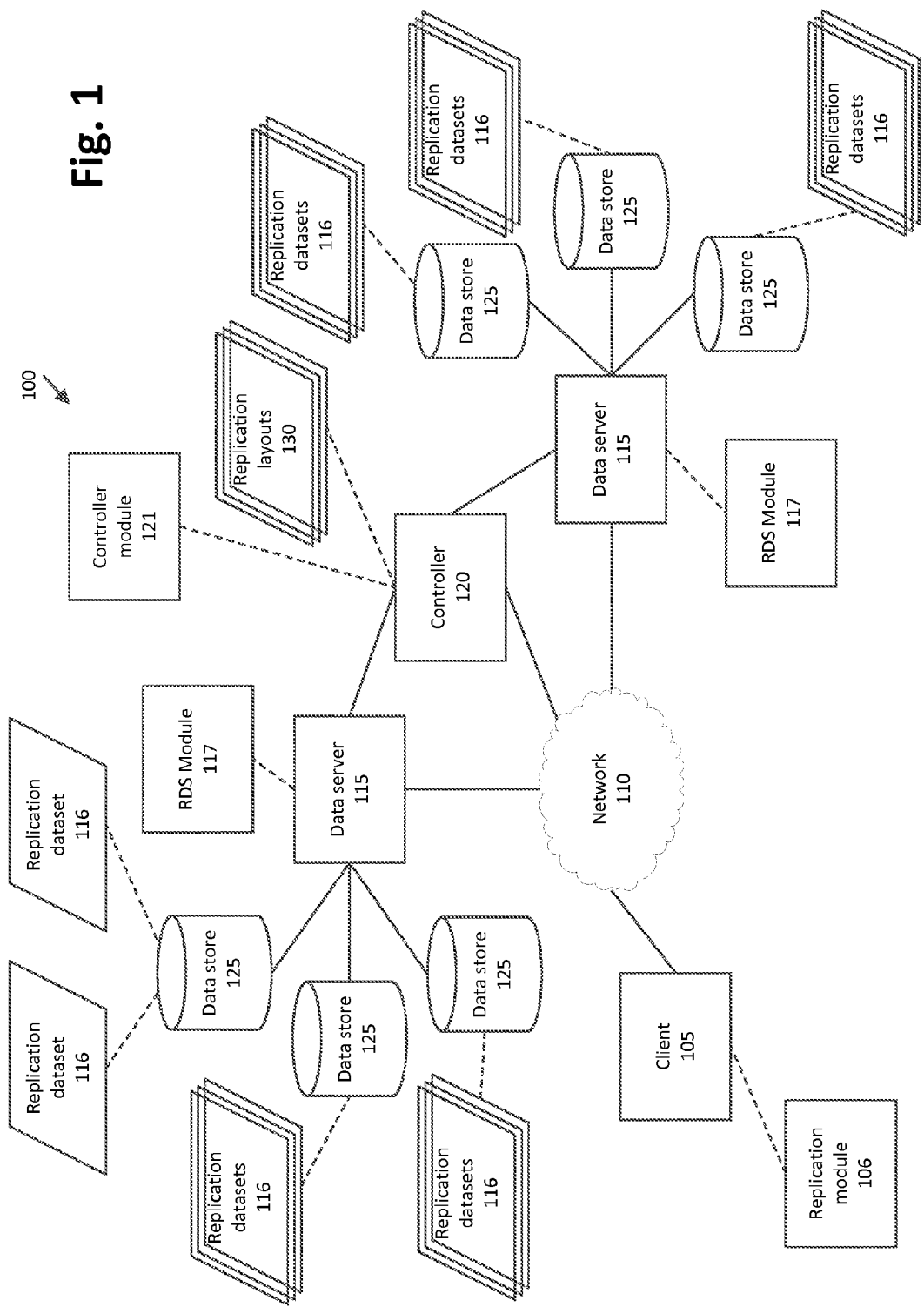
FIG. 1 is a block diagram of an exemplary data storage system.

FIG. 1 is a block diagram of an exemplary data storage system 100. A replication client (RCL) 105, e.g., according to instructions stored in a client replication module 106, communicates, generally via a network 110, with one or more replication data servers (RDS) 115 and one or more replication data controllers (RCR) 120 (although only one controller 120 is shown in FIG. 1) to perform data replication according to replication layouts 130. Each data server 115 and controller 120 communicates with one or more data stores 125.

A replication data server 115 is a networked file server implementing a replication layout mechanism, and providing access to, e.g., exporting, one or more replication data sets 116, in cooperation with one or more replication controllers 120. Necessarily, a replication data server implements the variant of the replication layout mechanism (or mechanisms) appropriate to the network (distributed) file system protocols which it supports. In one exemplary implementation, using NFSv4.1, the replication data server 115 is an NFSv4-protocol file server (metadata server), and implements a NFSv4.1 replication layout protocol extension. Data servers 115 are described herein as a "server" for convenience, and not by way of limitation, and may include any general-purpose computing device along with operating software and other sets of computer executable instructions to carry out operations described herein.

A replication client 105 may be any one of a number of computing devices that include a display, a processor and a memory, and that allow a user to communicate via the network 110. The RCL 105 generally includes a client application module 106, e.g., a set of computer-executable instructions stored in the memory of the client 105, and executed by its processor, for carrying out processes as described herein with respect to RCL 105. Client 105 may include, for example, a desktop computer, a laptop computer, a mainframe computer, a mini-computer, a cell phone, personal digital assistant, 3 or other similar device. Client 105 may also include one or more software applications for facilitating such communication over network 110, e.g., a web browser or the like. In addition, while only one client 105 is shown in FIG. 1, many different clients 105 may be connected to network 110 and may interact with other elements of the system 100 as described herein. An RCL client 105 generally conforms to a network, i.e., distributed, file system protocol, and to a replication layout mechanism corresponding to the protocol.

Network 110 is generally but not necessarily a packet network, and may be any suitable network for sending and receiving data, such as the Internet, a local area network, a wide area network, cellular network, etc.

A replication controller 120 is a replication data server functioning in a coordination role with respect to specific replication layouts 130, for a finite period. The RCR 120 issues, coordinates, and terminates replication layouts 130; layouts 130 are the base unit of replication in the system 100. Although one RCR 120 is shown in FIG. 1, the system 100 may include, and often does include, multiple RCRs 120. Further, an RCR 120 may be combined or co-located with a data server 115, although shown separately in FIG. 1. The RCR 120 generally includes a controller application module 121, e.g., a set of computer-executable instructions stored in the memory of the controller 120, and executed by its processor, for carrying out processes as described herein with respect to RCR 120.

Data stores 125 are generally, but not necessarily, included in a separate computing device other than an associated server 115, or may be a software application executing on server 115. Although only one data store 125 in FIG. 1 is shown having replication data sets 126, in general, each data store 125 generally includes one or more replication data sets 126. A replication dataset 126 is a distinguished tree of files and directories on some set of the replication data servers 115, i.e., a path or hierarchy rooted at a particular path such as defined by $S_{roots}$ described below. That is, the path(s) that are controlled by the replication layout, and which are integrity checked, as described herein, may be specified by $S_{roots}$ as described below. Each replication data set 126 generally persists on two or more of the data servers 115. Each RDS 115 generally includes a data server application module 117, e.g., a set of computer-executable instructions stored in the memory of the data server 115, and executed by its processor, for carrying out processes as described herein with respect to RDS 115.

One implementation of the system 100 contains an implementation-specific underlying configuration (UC). A UC is a map of servers 115 in the system 100 along with the data objects, e.g., file-trees, databases, etc., stored on the servers 115, including a specification of the specific servers 115 on which a data object is stored. The UC is generally not a factor in operations of the data storage system 100 other than as a way to establish preconditions for replication in the system 100; the UC provides a notion of and implementation of replication datasets 116, replication data servers 115, and coordination between them sufficient to establish or recover a consistent instance of replication dataset(s) 116 at some set(s) of replication data servers 115.

Figure 2:
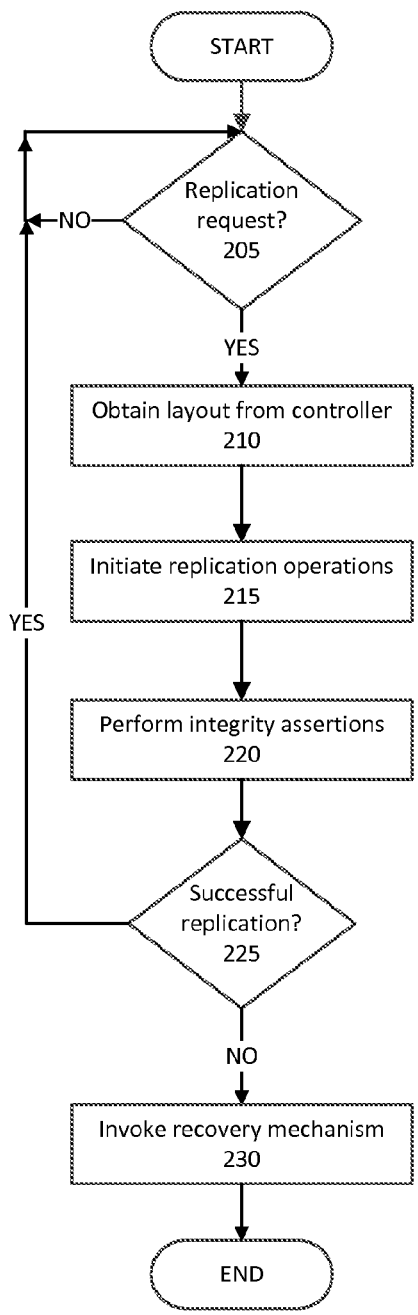
FIG. 2 illustrates an exemplary process for performing client-based data replication in the storage system of FIG. 1.
Figure 3:
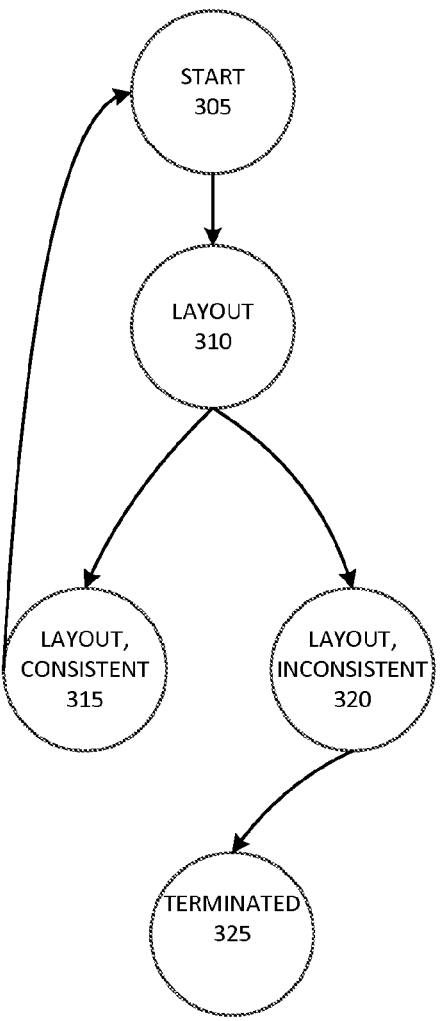
FIG. 3 is a state diagram illustrating states in the storage system.

FIG. 2 illustrates an exemplary process 200 for performing client 105-based data replication in the replication system 100. FIG. 3 is a state diagram 300 illustrating states in the replication system 100.

Turning to FIG. 2, the process 200 begins in a step 205, in which RCL 105, e.g., module 106, determines that it has received a request, e.g., based on user input, a trigger condition, a schedule, etc., to initiate a replication process. After such request is received, control proceeds to step 210. If no such request is received, process 200 remains in step 205. In step 205, the system 100 is in the start state 300 of FIG. 3.

Next, in step 210, the RCL 105 obtains a layout 130 from controller 120 to be used in the replication. For example, a client 105 request to the controller 120 for a layout 130 may include a specification of a data object or objects to be replicated, whereupon the controller 120 responds with the appropriate layout 130. In step 205, no layout 130 has been requested for replication (as occurs in step 210, described below), and the system 100 is in a start state 305, as shown in FIG. 3. Step 210 corresponds to a transition from the START state 305 to the LAYOUT state 310 shown in FIG. 3. That is, this state transition occurs upon the provision of a replication layout 130 from the controller 130 to the client 105.

In other words, a transition from the START state 305 to the LAYOUT state 310 is initiated by the replication client 105 in step 210, this transition being defined as a request to the RCR 120 for a replication layout 130 matching parameters for a layout specification provided as part of the request. For example, if the context of the system 100 includes NFSv4.1, clients 105 may request general layouts using a pNFS LAYOUTGET request. A LAYOUTGET request by a client 105, e.g., to a RCR 120, may be in the format Rlayoutget($S_{roots}$), where $S_{roots}$ is the set of trees of files and directories that the client 105 desires to update. In the context of NFSv4.1, using the standardized LAYOUTGET request, the client 105 may provide as the argument denoted by $S_{roots}$ a single NFSv4 filehandle of a directory which forms the root of one tree of files and directories that the client 105 intends to replicate. The client 105 can thus replicate an arbitrary set of roots by requesting a layout 130 for each root in the set. That is, the layout contains descriptions of objects that client 105 can replicate and a vector or vectors of servers 115 including possible replication objects and their locations, or paths, in the system 100. A layout 130 may also specify roles for a server 115 in a replication, e.g., a particular sever 115 may be a replication target only if replication fails at another server 115, only if a cost analysis establishes that a cost of replicating data to the server 115 is below a predetermined threshold, etc.

Returning to the process 200, next, in step 215, RCL 105 transmits instructions to affected elements in the system 100, e.g, servers 115, to initiate replication operations, e.g., to perform input/output operations to data servers 115 according to the replication layout 130 obtained in step 210, e.g., by transmitting the layout 130 via the network 110, to other cooperating clients 105, and to cooperating RCR's 120 and RDS's 115.

As discussed further below, in the LAYOUT state 310, the replication client 105 is permitted, i.e., there is a delegation of authority to the client 105 while in the LAYOUT state 310, to perform mutating operations on objects in a replication dataset 116 for some set of layouts 130 held by the client 105. For each mutating operation that the client 105 would ordinarily perform, if the target of the operation is in a replication dataset 116 of a replication layout 130 that the client 105 holds, the client 105 performs the operation serially or in parallel at each RDS 115 included in the set $S_{rds}$ in the corresponding layout 130.

Figure 4:
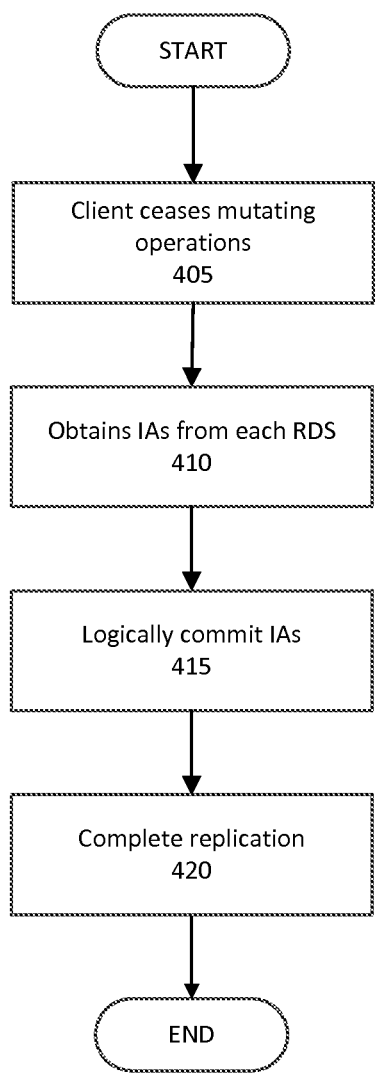
FIG. 4 illustrates an exemplary process for various modes of terminating replication operations.

Step 220 of the process 200 follows the termination of mutating operations in step 215. In step 220, the RCL 105 that obtained the layout 130 as described above with respect to step 210 obtains integrity assertions (IAs), as described further below, from each server 115 included in the replication process, and provides these integrity assertions to the controller 120. Thus, the controller 120 is relieved of the overhead of communications with the servers 115 to determine the results of a replication operation; consumption of other overhead and resources, such as network usage, are generally also reduced. In general, an integrity assertion is information from a server 115 that can be used to determine whether a replication was successful. FIG. 4, discussed below, describes a process 400 by which a client 105 obtains IAs from servers 115. Further, an examplary implementation of integrity assertions is described in more detail below.

Next, in step 225, RCL 105 receives from a RCR 120 an indication of whether the replication was successful. In an exemplary implementation, the result of a successful replication layout request returned to the RCL 105 from a RCR 120 is a replication layout 130 $L_r$=(RCL, RCR, $S_{roots}$, $S_{rds}$), where RCL is the requesting client 105, RCR is the replication controller 120, $S_{root}$ is a set of root directories as described above, and $S_{rds}$ is a set of replication data servers 115. The set $S_{rds}$ is constructed by the RCR 120, and is valid only to the requesting RCL 105, and only for the lifetime of $L_r$. The representation of each RDS 115 in $S_{rds}$ is an ordered 2-tuple $L_{rds}$=($A_{rds}$, $Id_{(L, rds)}$), where $A_{rds}$ is the addressable location of each RDS 115 in the UC for the system 100, and $Id_{(L, rds)}$ uniquely identifies (the specific layout 130) L at the identified RDS 115. $A_{rds}$ is an ordinary server address in the UC, meaning it provides sufficient information for the RCL 105 to establish communications with the RDS 115 using an appropriate mechanism of the UC, e.g., a network path specified for the RDS 115. For example, in the context of NFSv4.1, a vector of NFSv4 server address structures is provided by the underlying NFSv4.1 layout mechanism. Meanwhile, $Id_{(L,rds)}$ is an implementation-specific unique identifier for a particular layout 130, such that all communications with RDS 115 about a layout 130 L may be tagged with the identifier. In implementations using NFSv4.1, $Id_{(L, rds)}$ is defined to be L's unique layout stateid.

Further processes for terminating a replication and for determining whether a replication was successful are discussed in further detail below with respect to FIGS. 4 and 5. In any event, if the replication was successful, which corresponds to a transition the LAYOUT, CONSISTENT state 315 shown in FIG. 3, the process 200 returns to step 205. That is, a successful replication causes the transition from the LAYOUT state 305 to the LAYOUT, CONSISTENT state 315. If the replication was not successful, process 200 proceeds to step 230. An unsuccessful replication causes the transition from the LAYOUT state 305 to the LAYOUT, INCONSISTENT state 320.

In step 230, as may be provided for in the UC, any suitable mechanism may be used to establish or recover consistency, e.g., an offline synchronization of datasets using recursive file copy over an arbitrary protocol, recovery by application of a file-system snapshot or similar differential, block copy, etc. Following step 230, process 200 terminates.

As is seen in FIG. 3, no transition from the LAYOUT, INCONSISTENT state 320 to the START state 305 is defined, because when a replication has encountered error, external mechanisms are generally required to repair effects of the error, and the system 100 enters a replication TERMINATED state 325. However, as is also seen in FIG. 3, the LAYOUT, CONSISTENT state 315 is generally terminated by a return to the START state 305.

The conditions and behavior coincident with the termination of the LAYOUT state 310, include replication terminating either successfully (transition to state 315) or unsuccessfully (transition to state 320). By definition, the set of objects in a replication dataset 116 are consistent at the start of replication, that is, in the START state 305. Further, as described herein, consistency at the close of operations may be determined through integrity assertions (IA) propagated to RCR 120 whenever no further replication operations will be performed, when the number of operations executed would exceed an arbitrary bound, or at the request of the RCR 120.

FIG. 4 illustrates an exemplary process 400 which, for any of the foregoing modes of terminating replication operations, must complete for the replication process related to a layout 130 to complete successfully, i.e., in order to transition from the LAYOUT, CONSISTENT state 315 to the START state 305.

First, in a step 405, the RCL 105, i.e., a requesting RCL 105 such as described above concerning step 205 of process 200, ceases mutating operations, i.e., operations that may modify the state of the dataset 116, on any objects in the replication dataset 116, and on every RDS 115, in the replication layout 130 that is terminating. Note that step 405 of process 400 generally corresponds to step 220 of process 200.

Next, in a step 410, the RCL 105 must obtain from each RDS 115 in the set $S_{rds}$ a signed replication integrity assertion ($IA_L$, $S(IA_L)$). An object $IA_{(L, RDS)}$, an example of which is described in further detail below, reliably and compactly represents the state of the replication dataset at each RDS, and also reliably asserts to both RCL 105 and, in particular, to RCR 120, that a specific RDS 115 is the origin of the signature. A signature $S(IA_L)$ includes an encrypted authentication code, as described further below. IAs thus provide a mechanism for clients 105 to receive information concerning the success or failure of a replication without having to determine a state of each server 115. Further, data servers 115 involved in the replication process can be released from having to maintain their states related to replication, i.e., become stateless with respect to replication, after having provided an IA, and moreover, the RCR 120 is freed of having to expend resources and consume overhead to communicate with each RDS 115 to determine their states and whether a replication process was successful. Freeing servers 115 from replication states, reducing consumption of RDS 115 and other system 100 resources, as well as other efficiencies, is a benefit of client 105-based replication.

Next, in a step 415, the RCL 105 transfers the collected integrity assertions $S_{(IA(L,RDS))}$ to RCR 120 in a logical commit operation on the layout 130 specified for the replication. For example, in the context of NFSv4.1 the logical commit operation is the pNFS LAYOUTCOMMIT operation, and the set of replication integrity assertions is the layout-type specific LAYOUTCOMMIT data for a layout of an arbitrary replication layout type having a unique or practically unique name.

Alternatively, a layout completion operation may be accomplished in any UC-consistent manner. The RCR 120 verifies first the message integrity of each provided integrity assertion. Message integrity verification ensures that the integrity assertion is self-consistent, but also that it originated at the specific, claimed RDS 115, whose cryptographic identity is known (or may be verified). If the initial message integrity verification is successful, the RCR 120 next compares the integrity assertions at each RDS 115. If the assertions match, then the logical commit is successful and the replication process transitions to the LAYOUT, CONSISTENT state 315. Otherwise, as mentioned above, the replication process transitions to the LAYOUT, INCONSISTENT state 320.

Returning to the process 400, next, in a step 420, the replication completes for a layout 130, when, subsequent to a logical commit operation and having performed no further mutating operations as set forth above, RCL 105 completes or returns the layout 130 to the RCR 120. In implementations using NFSv4.1, the layout completion operation is the pNFS LAYOUTRETURN operation.

Following step 420, the process 400 ends. As an alternative to the process 400, it is possible that the layout completion operation is accomplished in some other UC-consistent manner.

Figure 5:
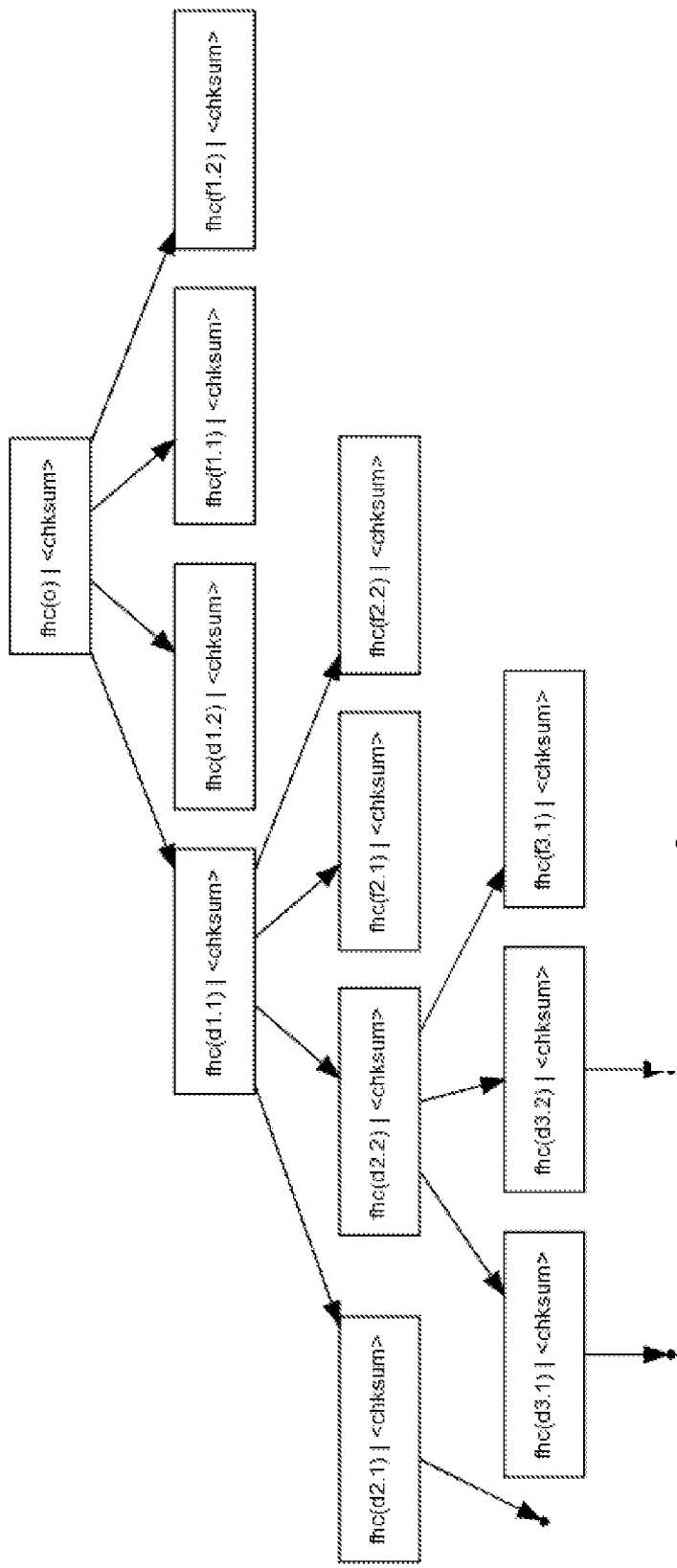
FIG. 5 illustrates details of an exemplary integrity assertion.

FIG. 5 illustrates aspects of an exemplary integrity assertion in further detail. An integrity assertion $IA_{(L,RDS)}$ is a mathematical result computed at a specific RDS 115, in response to a request originating at RCL 105 as described above, in an operation referred herein as "Rintegrity." The Rintegrity operation takes as parameters a layout 130 referred to as the "RLayout" parameter, and a type T, various types of Rintegrity operations being described below, and returns a signed integrity assertion $IA_L$, $S_{(IAL)}$ on the objects specified by the layout 130 at the time of execution. A signed integrity assertion $IA_L$, $S_{(IAL)}$ is an ordered 2-tuple of the integrity assertion $IA_{(L,RDS)}$ and a cryptographic message authentication code $S_{(IAL)}$ computed from $IA_{(L,RDS)}$ and a secret derived from cryptographic identity K specific to a particular RDS 115, and stored by RCR 120 (as well as RDS 115). Thus, the controller 120 can confirm the identity of the data server 120 from the signature, as well as the result of the replication, from the IA.

Considering first the computation of $IA_{L,RDS}$, the function Rintegrity(L, 1), i.e., where type=1, considers the complete set of objects $S_r$ that have been modified under a layout 130 L, and evaluates to $IA_L=IA(S_r, RDS(S_r))$. The precondition for computing Rintegrity(L, 1) is that the RDS 115 has retained the set of all objects mutated under the layout 130. If the RDS 115 has failed to retain a trace of each object updated under the layout 130 L, the value of $IA_L$ is returned as the fixed unsigned integral value 0. Otherwise, $IA_L$ is a linear hash value composed from the recursively computed hash values of each object modified under L, taken as a byte stream and totally ordered in an object-type specific manner.

The function Rintegrity(L, 2), i.e., where type=2, considers the tree of objects rooted at the layout 130 L, and evaluates to $IA_L=IA(FHC(L_{root}), RDS(Sr))$, where $FHC(L_{root})$, $RDS(S_r)$ is the file hierarchical checksum, as illustrated in FIG. 5, of the objects $L_{root}$ as represented at the specified RDS 115. Let FHC(o) be recursive a hash function over arbitrary file system objects o. When o is a file, FHC(o) evaluates to a linear hash of the file's data. When o is a directory, FHC(o) evaluates to a linear hash of file name fn(e), (a subset of) file attributes attrs(e), and FHC(e) for each entry e in o, taken as a byte stream and in a fixed order. Then FHC(o) forms a hash tree, or Merkle tree, in which each node is made to correspond to a file or directory entry in the tree of file system objects rooted at o, and $FHC(L_{root})$ is an FHC tree coincident with the replication layout L. The hashed value of FHC(o) verifies the structure of the entire tree rooted at o, with a reliability proportional to the strength of the hash function(s) employed. The hashed value of $FHC(L_{root})$ verifies the entire replication dataset for a specific layout L. FHC(o) may in a particular implementation be computed ahead-of-time, continuously or under specific conditions. The specific set of attributes, file entry ordering, and hash function(s) used to compute FHC(o) might differ between implementations of the replication layout mechanism or be taken differently in one implementation at different times, but generally is required to be consistent at each $L_{root}$, $RDS(S_r)$ in any specific replication layout.

In implementations using NFSv4.1, Rintegrity is a new operation RINTEGRITY defined for the replication layout mechanism in the RPC (remote procedure call) interface of the RDS 115. Alternatively, the Rintegrity operation may be accomplished in any UC-consistent manner.

Computing devices such as RCL 105, RDS 115, RCR 120, etc. may employ any of a number of computer operating systems known to those skilled in the art, including, but by no means limited to, known versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, Apple OS-X Operating Systems, and/or Mobile and Tablet Operating Systems such as Android, from the Open Handset Alliance consortium (including Google), and Apple's iOS for iPad, iPhone and iPod Touch. Computing devices may include any one of a number of computing devices known to those skilled in the art, including, without limitation, a computer workstation, a desktop, notebook, laptop, tablet computer, smartphone, or handheld computer, or some other computing device known to those skilled in the art.

Computing devices such as the foregoing generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Python, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any non-transitory medium that participates in providing data (e.g., instructions), which may be read by a computer. Such a medium may take many forms, including, but not limited to, non-volatile media, volatile media, and other media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, Blu-Ray, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving, in a client computing device having a processor and a memory, in response to a request, a replication layout from a replication controller;
   initiating, in the client device, a data replication request at each of a plurality of data servers according to the replication layout;
   receiving, in the client device, from each of the data servers, integrity information representing a state of a replication dataset at each of the servers; and
   transmitting, from the client device, the integrity information to the replication controller;
   wherein the integrity information includes a replication integrity assertion that is a mathematical result computed at a specific data server (RDS) for the layout (L); and
   the integrity assertion is included in an ordered pair ($IA_L$, $S(IA_L)$), where $IA_L$ represents the state of the replication dataset at a data server providing the integrity assertion, and $S(IA_L)$ is a signature from the data server providing the integrity assertion that includes an encrypted authentication code.

2. The method of claim 1, further comprising, in the replication controller, evaluating the integrity information to determine whether the replication request was performed successfully.

3. The method of claim 1, wherein $IA_L$ is a linear hash value composed from recursively computed hash values of each data object modified under the layout.

4. The method of claim 1, wherein $IA_L$ is based on is a file hierarchical checksum of objects $L_{root}$ represented in the layout at the data server providing the integrity assertion.

5. The method of claim 1, wherein each of the data servers becomes stateless with respect to replication upon transmitting the integrity information.

6. A system, comprising:
   a computing device that includes a processor and a memory, the device configured to:
   receive, in response to a request, a replication layout from a replication controller;
   initiate a data replication request at each of a plurality of data servers according to the replication layout;
   receive, from each of the data servers, integrity information representing a state of a replication dataset at each of the servers; and
   transmit the integrity information to the replication controller;
   wherein the integrity information includes a replication integrity assertion that is a mathematical result computed at a specific data server (RDS) for the layout (L); and
   the integrity assertion is included in an ordered pair ($IA_L$, $S(IA_L)$), where $IA_L$ represents the state of the replication dataset at a data server providing the integrity assertion, and $S(IA_L)$ is a signature from the data server providing the integrity assertion that includes an encrypted authentication code.

7. The system of claim 6, wherein the replication controller is configured to evaluate the integrity information to determine whether the replication request was performed successfully.

8. The system of claim 6, wherein $IA_L$ is a linear hash value composed from recursively computed hash values of each data object modified under the layout.

9. The system of claim 6, wherein $IA_L$ is based on is a file hierarchical checksum of objects $L_{root}$ represented in the layout at the data server providing the integrity assertion.

10. The system of claim 6, wherein each of the data servers becomes stateless with respect to replication upon transmitting the integrity information.

11. A computer-readable medium tangibly embodying instructions executable by a computer processor, the instructions comprising instructions for:
   receiving, in a client computing device having a processor and a memory, in response to a
   request, a replication layout from a replication controller;
   initiating, in the client device, a data replication request at each of a plurality of data servers according to the replication layout;
   receiving, in the client device, from each of the data servers, integrity information representing a state of a replication dataset at each of the servers; and
   transmitting, from the client device, the integrity information to the replication controller;
   wherein the integrity information includes a replication integrity assertion that is a mathematical result computed at a specific data server (RDS) for the layout (L); and
   the integrity assertion is included in an ordered pair ($IA_L$, $S(IA_L)$), where $IA_L$ represents the state of the replication dataset at a data server providing the integrity assertion, and $S(IA_L)$ is a signature from the data server providing the integrity assertion that includes an encrypted authentication code.

12. The medium of claim 11, wherein the replication controller is configured to evaluate the integrity information to determine whether the replication request was performed successfully.

13. The medium of claim 11, wherein $IA_L$ is a linear hash value composed from recursively computed hash values of each data object modified under the layout.

14. The medium of claim 11, wherein $IA_L$ is based on is a file hierarchical checksum of objects $L_{root}$ represented in the layout at the data server providing the integrity assertion.

15. The medium of claim 11, wherein each of the data servers becomes stateless with respect to replication upon transmitting the integrity information.

* * * * *